(12) United States Patent
Kunisawa

(10) Patent No.: US 7,780,558 B2
(45) Date of Patent: Aug. 24, 2010

(54) BICYCLE REAR DERAILLEUR

(75) Inventor: Satoru Kunisawa, Osaka (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 11/936,941

(22) Filed: Nov. 8, 2007

(65) Prior Publication Data

US 2008/0194363 A1 Aug. 14, 2008

(30) Foreign Application Priority Data

Feb. 9, 2007 (JP) ............... 2007-030266

(51) Int. Cl.
*F16H 7/18* (2006.01)
*F16H 9/00* (2006.01)
(52) U.S. Cl. .............. 474/80; 474/82; 474/78
(58) Field of Classification Search ............ 474/80, 474/82
See application file for complete search history.

(56) References Cited

U.S. PATENT DOCUMENTS

| | | | |
|---|---|---|---|
| 4,612,004 A | 9/1986 | Nagano | |
| 4,619,632 A * | 10/1986 | Nagano | 474/80 |
| 5,421,786 A * | 6/1995 | Ando | 474/78 |
| 6,203,459 B1 | 3/2001 | Calendrille, Jr. | |
| 2004/0087397 A1 | 5/2004 | Campagnolo et al. | |

FOREIGN PATENT DOCUMENTS

| | | |
|---|---|---|
| EP | 0 036 299 A2 | 9/1981 |
| EP | 0 543 452 A1 | 5/1993 |
| EP | 0 657 346 A2 | 6/1995 |
| EP | 1 342 659 A2 | 9/2003 |
| FR | 1 258 146 | 4/1961 |
| FR | 2 550 299 | 2/1985 |
| JP | 05-069878 A | 3/1993 |

* cited by examiner

*Primary Examiner*—Bradley T King
*Assistant Examiner*—Mahbubur Rashid
(74) *Attorney, Agent, or Firm*—Global IP Counselors, LLP

(57) ABSTRACT

The chain guide of a bicycle rear derailleur is a chain guide which is connected to a movable member so that this guide is free to swing about a center pivot axis. The chain guide has a pair of plate members rotatably supporting a guide pulley and a tension pulley. One of the plate members is provided with a chain slip prevention part which is disposed between both plate members in the vicinity of the guide pulley. Preferably, the chain slip prevention part has a width of ten mm or greater and fifty mm or less.

13 Claims, 11 Drawing Sheets

BICYCLE REAR DERAILLEUR

CROSS-REFERENCE TO RELATED APPLICATIONS

This application claims priority under 35 U.S.C. §119 to Japanese Patent Application No. 2007-030266, filed Feb. 9, 2007. The entire disclosure of Japanese Patent Application No. 2007-030266 is hereby incorporated herein by reference.

BACKGROUND OF THE INVENTION

1. Field of the Invention

The present invention relates to a derailleur. More specifically, the present invention relates to a bicycle rear derailleur which is mounted on the frame of a bicycle and which is used to selectively transfer a chain to one of a plurality of sprockets mounted on the rear wheel hub axle.

2. Background Information

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle.

Derailleurs constitute externally mounted gearshift devices that are mounted on bicycles, and particularly on sports type road racers and mountain bikes. Rear derailleurs typically have a mounting member, a link mechanism (one example of a moving mechanism), a movable member and a chain guide. The mounting member is mounted on the frame. The link mechanism is mounted between the mounting member and the movable member. The movable member can move relative to the mounting member via the link mechanism. The chain guide is mounted on the movable member so that this chain guide is free to swing. The chain guide moves the chain in order to transfer the chain to one of the rear sprockets. The chain guide has an outside plate member, an inside plate member, a guide pulley and a tension pulley. The outside plate member is mounted on the movable member so that this outside plate member is free to swing. The inside plate member is spaced from the outside plate member to form a chain receiving space between the two plate members. The guide pulley is rotatably mounted between the two plate members at the first ends of the two plate members and can engage with the chain. The tension pulley first ends of the two plate members and can engage with the chain.

In a conventional rear derailleur, a chain slip prevention part which prevents the chain from slipping off of the guide pulley is formed by bending the inside plate member toward the outside plate member between the supporting parts of both pulleys on the inside plate member (for example, see Japanese Laid-Open Patent Application No. 5-69878). This conventional chain slip prevention part is formed with a relatively narrow width. The reason for this is that inherently there is no need for a large width in order to prevent slipping of the chain. Furthermore, the end part of the chain slip prevention part that is in close proximity to the guide pulley is disposed on the tension pulley side of a straight line which is perpendicular to a straight line that connects both of the pulleys, and which is tangential to an imaginary circle that connects the tips of the teeth of the guide pulley. In other words, such a conventional chain slip prevention part is disposed so that this part is at a considerable distance from the guide pulley.

Furthermore, the inside plate member of a conventional chain guide has a guide pulley supporting part the supports the guide pulley, with the guide pulley supporting part having a circular arc shaped outer peripheral edge with a diameter that is approximately 50 to 60 percent of that of an imaginary circle that connects the tips of the teeth of the guide pulley. Thus, the guide pulley supporting part is configured so that the chain will be easily moved out of alignment during gear shifting. The outer peripheral edge of the inside plate member has a rectilinear bent part that extends rectilinearly from this circular arcuate part and that further extends from this location to the chain slip prevention part.

In the abovementioned conventional structure, when, for example, the chain is carried on the sprocket having the largest diameter in the forward-rearward direction, and the tension acting on the chain is increased. Instances may exist in which the chain guide is oriented so as to swing forward by a considerable amount in the counterclockwise direction as seen from the outside. When the chain guide swings in this manner, since the spacing of the sprocket teeth is approximately 10 mm, both ends of the chain slip prevention part disposed on the inside plate member may be forced into and become caught in the spaces between the teeth of large-diameter sprockets. When a sprocket rotates in the forward direction in a state in which the chain slip prevention part is caught between the teeth, the inside plate member may be forcibly moved by the sprocket, and there is a danger that the rear derailleur will be broken.

Meanwhile, since the chain slip prevention part disposed on a conventional inside plate member is at a considerable distance from the guide pulley in the positional relationship described above, there also may be instances under special conditions in which the chain is unable to return once the chain has left the guide pulley. Specifically, when an upshifting operation is performed in a state in which the crank is not rotating, and the chain guide moves to a sprocket on the small diameter side, the chain may slip from the tips of the teeth of the guide pulley under conditions in which the crank is rotated in reverse. The chain that has slipped from the guide pulley returns to the space between the inside and outside plates at the end part of the chain slip prevention part; however, since the end part of the chain slip prevention part is at a considerable distance from the guide pulley, the portion of the chain that has slipped from the guide pulley is positioned in a location that is at a considerable distance from the tooth parts of the guide pulley. As a result, even if the crank is rotated in the forward direction, the chain may not return to the guide pulley.

In view of the above, it will be apparent to those skilled in the art from this disclosure that there exists a need for an improved bicycle rear derailleur. This invention addresses this need in the art as well as other needs, which will become apparent to those skilled in the art from this disclosure.

SUMMARY OF THE INVENTION

One object of the present invention is to provide a bicycle rear derailleur that makes it difficult for the chain slip prevention part disposed on the chain guide to become caught in the sprockets.

Another object of the present invention is to provide a bicycle rear derailleur that ensures the chain can return to the guide pulley even if the chain should slip from the guide pulley toward the inside plate member.

The bicycle rear derailleur according to a first aspect of the present invention is a rear derailleur that basically comprises a mounting member, a base member, a moving mechanism, a movable member and a chain guide. The mounting member has a bracket having a fastening part that is configured to be fastened to a bicycle frame and a supporting part disposed rearwardly of the fastening part when the fastening part is fastened to the bicycle frame. The base member is rotatably mounted on the supporting part to rotating about a first center pivot axis. The moving mechanism is a mechanism which is connected at one end to the base member and which can move with respect to the base member. The movable member is movably connected at a first end to the base member to move with respect to the base member. The chain guide includes a first plate member, a second plate member, a guide pulley, a tension pulley and a chain slip prevention part. The first plate member is pivotally connected to the movable member to swing about a second center pivot axis. The second plate member is connected to the first plate member to define a chain receiving gap between the first and second plate members. The guide pulley is rotatably supported between the first and second plate members at first ends of the first and second plate members. The tension pulley is rotatably supported between the first and second plate members at second ends of the first and second plate members. The chain slip prevention part is disposed between the first and second plate members in the vicinity of the guide pulley with the chain slip prevention part having a width of 10 mm or greater and 50 mm or less.

In this rear derailleur, the moving mechanism is moved by a gearshift cable, actuator, or the like during gear shifting. As a result of the movement of the moving mechanism, the chain guide moves to a position facing one of a plurality of rear sprockets lined up in the direction of the hub axle, and guides the chain onto one of these rear sprockets. In this case, the chain guide swings about the second center pivot axis. In a case in which the chain is engaged with the sprocket having the maximum diameter in the forward-rearward direction, the chain guide swings furthest forward. As a result, the chain slip prevention part disposed in the vicinity of the guide pulley may come into contact with the teeth of the maximum-diameter rear sprocket.

The gap between two teeth on the rear sprockets that are ordinarily used is approximately 10 mm. Here, since the width of the chain slip prevention part is 10 mm or greater and 50 mm or less, even if one end of the chain slip prevention part comes into contact with the gap between the teeth of a rear sprocket, the other end tends not to enter the gap between these teeth. If the width of the chain slip prevention part is less than 10 mm, the chain slip prevention part tends to enter the gaps between the teeth of the rear sprockets, and if this width exceeds 50 mm, the chain guide becomes heavy. The first center pivot axis, which is the swinging center of the base member, is positioned to the rear of the fastening part when the mounting member is fastened to the bicycle. Since the first center pivot axis is positioned to the rear of the fastening part and is at a considerable distance from the rotational center of the sprockets, there is a considerable distance between the rotational direction of the rear sprockets and the swinging direction of the chain guide caused by the swinging of the base member about the first center pivot axis. As a result, even if one end of the chain slip prevention part should contact the spaces between the teeth of a rear sprocket, the chain slip prevention part can easily slip out of the spaces between the teeth when the pedals are pushed in the forward direction and the rear sprocket is caused to rotate in the forward direction. Here, since the width of the chain slip prevention part disposed on the chain guide is set at a considerable width of 10 mm or greater and 50 mm or less, both ends of the chain slip prevention part do not enter the gaps between the teeth of the sprocket. Furthermore, since the supporting part on which the swinging base member is supported is positioned to the rear of the fastening part, the first center pivot axis, which is the swinging center of the base member, is greatly shifted in position to the rear of the fastening part of the frame. Accordingly, even if one end of the chain slip prevention part comes into contact with the space between the teeth, the direction of swinging of the chain guide caused by the swinging of the base member about the first center pivot axis is greatly shifted in position toward the outside in the radial direction of the sprocket with respect to the direction of rotation of the sprocket if the sprocket is rotated in the forward direction. As a result, even if one end of the chain slip prevention part comes into contact with the gap between the teeth, the chain slip prevention part can easily slip out from the gap between the teeth. Accordingly, the chain slip prevention part tends not to engage with the sprocket.

The bicycle rear derailleur according to a second aspect is the derailleur according to the first aspect, wherein the fastening part includes a shaft member that has a third center pivot axis, with a minimum distance from the first center pivot axis to the chain slip prevention part being greater than a minimum distance from the third center pivot axis to the chain slip prevention part when the bracket is fastened to the bicycle frame. In this case, regardless of the gearshift position, the circular arc traced by the chain slip prevention part when the base member swings about the first center pivot axis is greater than in a case in which the base member is fastened directly to the frame. Accordingly, a synergistic effect is achieved in combination with the fact that the first center pivot axis (supporting part) is located to the rear of the fastening part, whereby the swinging direction of the chain guide caused by the swinging of the base member about the first center pivot axis is shifted in position by an even greater amount toward the outside in the radial direction of the sprocket with respect to the rotational direction of the sprocket. Accordingly, the chain slip prevention part is even less likely to engage with the sprocket.

The bicycle rear derailleur according to a third aspect is the derailleur according to the first or second aspect, wherein the guide pulley has a rotational center that coincides with the second center pivot axis. In this case, since the swinging center of the chain guide and the rotational center of the guide pulley coincide, the guide pulley and chain guide can be supported on the movable member by the same member, and the supporting structure of the guide pulley and chain guide can be simplified.

The bicycle rear derailleur according to a fourth aspect is the derailleur according to any of the first through third aspects, wherein the chain slip prevention part is an integral, one-piece unitary part of one of the first and second plate members with the chain slip prevention part being bent from the one of the first and second plate members toward the other of the first and second plate members. In this case, since the chain slip prevention part can be constructed simply by bending one of the two plate members, the structure of the chain slip prevention part is simplified.

The bicycle rear derailleur according to a fifth aspect is a rear derailleur that basically comprises a mounting member, a moving mechanism, a movable member and a chain guide. The moving member is configured to be fastened to a bicycle frame. The moving mechanism is movably connected at a first end to the mounting member to move with respect to the mounting member. The movable member is connected to a second end of the moving mechanism. The chain guide includes a first plate member, a second plate member, a guide pulley, a tension pulley and a chain slip prevention part. The first plate member is pivotally connected to the movable member to swing. The second plate member is connected to the first plate member to define a chain receiving gap between the first and second plate members. The guide pulley is rotatably supported between the first and second plate members at first ends of the first and second plate members. The tension pulley is rotatably supported between the first and second plate members at second ends of the first and second plate members. The chain slip prevention part is disposed between the first and second plate members. The chain slip prevention part includes a first end part that is a farthest point from the tension pulley as measured in a first direction that is parallel to a first straight line running between rotational centers of the guide pulley and the tension pulley. The first end part is disposed at a position that is closer to the guide pulley than a second straight line extending perpendicularly to the first straight line and extending tangentially to an imaginary circle connecting outer tips of teeth of the guide pulley. The second plate member includes an outer peripheral edge having a first outer edge part with a curvilinear shape extending from a first outer edge position, which is closest to the first end part, to a second outer edge position, which is where the outer peripheral edge is at a minimum distance from the rotational center of the guide pulley. The curvilinear shape of the outer edge part is configured so that a distance measured from the rotational center of the guide pulley to the outer edge part decreases in a continuous manner from the first outer edge position to the second outer edge position. The minimum distance at the second outer edge position is in a range extending from 40% of a radius of the imaginary circle to a value obtained by subtracting 4 mm from the radius of the imaginary circle.

In this rear derailleur, when an upshifting operation is performed and the chain guide is moved to a sprocket on the small-diameter side in a state in which the crank is not rotated, the chain may slip from the guide pulley to the outside of the second plate member if the crank is rotated in reverse. In this state, the chain that has slipped off returns to the space between the first and second plates in the vicinity of the first end part of the chain slip prevention part. Here, the first end part of the chain slip prevention part is disposed in a position which is closer to the guide pulley than a second straight line which is perpendicular to a first straight line that connects the rotational center of the guide pulley and the rotational center of the tension pulley, and which is tangential to an imaginary circle that connects the tips of the teeth of the guide pulley. Accordingly, the chain returns to the space between both plates in the vicinity of the guide pulley, and although the chain may slip from the guide pulley, the extent of this slipping is slight. In other words, the part of the chain that has slipped is only slightly removed from the guide pulley.

Furthermore, on the outer edge of the second plate member on the opposite side from the tension pulley, the first outer edge part extending from the first outer edge position, which is closest to the first end part, to the second outer edge position, where the distance between the outer edge and the rotational center of the guide pulley is a minimum distance, has a curvilinear shape that is formed so that the distance from the rotational center decreases in a continuous manner. Furthermore, the distance at the second outer edge position ranges from 40% of the radius of the imaginary circle to a value obtained by subtracting 4 mm from the radius of the imaginary circle. Accordingly, in the first outer edge part in contact with the chain that has slipped off, the distance to the rotational center of the guide pulley decreases in a continuous manner from the first outer edge position toward the second outer edge position, and the distance at the second outer edge position is relatively large. As a result, when the crank is turned in the forward direction, and the chain is moved in the forward direction, the chain that has slipped off in a position near the guide pulley is pulled by the sprocket and is caused to ride over the first outer edge part from the vicinity of the first outer edge position. The chain is guided by this action and is caused to reengage with the guide pulley. As a result, the chain that has slipped off from the guide pulley can return to the guide pulley. Furthermore, if the abovementioned distance is less than 40% of the radius of the imaginary circle, then even if the chain comes into contact with the first outer edge part after slipping off, the chain tends not to catch on the guide pulley. Ordinarily, furthermore, the maximum width (maximum height) of a bicycle chain link is approximately 8 mm; accordingly, if the distance from the rotational center at the second outer edge position is a distance that exceeds a value obtained by subtracting 4 mm from the radius of the imaginary circle, the chain ordinarily tends not to move beyond the second plate member during gear shifting.

Here, the first end part of the chain slip prevention part is disposed in a position near the guide pulley that protrudes furthest in the first direction, and the first outer edge part that comes into contact with the chain when the chain slips off is constructed so that the distance from the rotational center in the area extending from the first outer edge position to the second outer edge position decreases in a continuous manner. Moreover, even at the second outer edge position, the distance from the rotational center of the guide pulley is large, i.e., is a distance ranging from 40% of the radius of the imaginary circle to a value obtained by subtracting 4 mm from the radius of the imaginary circle. Accordingly, even if the chain should slip from the guide pulley, the chain is pulled so as to be able to ride over the first outer edge part and return to the guide pulley when moved in the forward direction.

The bicycle rear derailleur according to a sixth aspect is the derailleur according to the fifth aspect, wherein the first outer edge part of the second plate member is spaced from the rotational center of the guide pulley by a distance that is in a range extending from 40% to 150% of the radius of the imaginary circle. In this case, since the proportion of the variation in the distance from the first outer edge position to the second outer edge position is large, the chain securely rides over the first outer edge part.

The bicycle rear derailleur according to a seventh aspect is the derailleur according to the sixth aspect, wherein the outer peripheral edge of the second plate member includes a second outer edge part with a curvilinear shape extending beyond the second outer edge position on an opposite side from the chain slip prevention part, the curvilinear shape of the second outer edge part being formed so that a distance from the rotational center increases in a continuous manner as the second outer edge part extends away from the second outer edge position. In this case, even if the chain should slip from the chain guide when the chain is mounted on a relatively small-diameter sprocket among the front and rear sprockets, and the chain guide swings to the rear, the first and second outer edge parts guide the chain, and the chain that has slipped off can easily return to the guide pulley. As a result, the chain tends to return to the guide pulley in such cases as well.

The bicycle rear derailleur according to an eighth aspect is the derailleur according to any of the fifth through seventh aspects, wherein the chain slip prevention part is an integral, one-piece unitary part of the second plate member with the chain slip prevention part being bent from the second plate member toward the first plate member so that the first end part and the first outer edge position substantially coincide. In this case, since the chain slip prevention part can be constructed simply by bending the second plate member, which is in the direction in which the chain slips off, the structure of the chain slip prevention part is simplified.

The bicycle rear derailleur according to a ninth aspect is the derailleur according to any of the fifth through eighth aspects, wherein the mounting member includes a bracket and a base member. The bracket has a fastening part that is configured to be fastened to a bicycle frame and a supporting part disposed rearwardly of the fastening part when the fastening part is fastened to the bicycle frame. The base member is rotatably mounted on the supporting part. In this case, the bracket swings to the rear of the fastening part; accordingly, the rotational direction of the sprockets and the swinging direction of the chain guide caused by the swinging of the base member are greatly shifted in position, and the chain slip prevention part tends not to engage with the sprockets.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
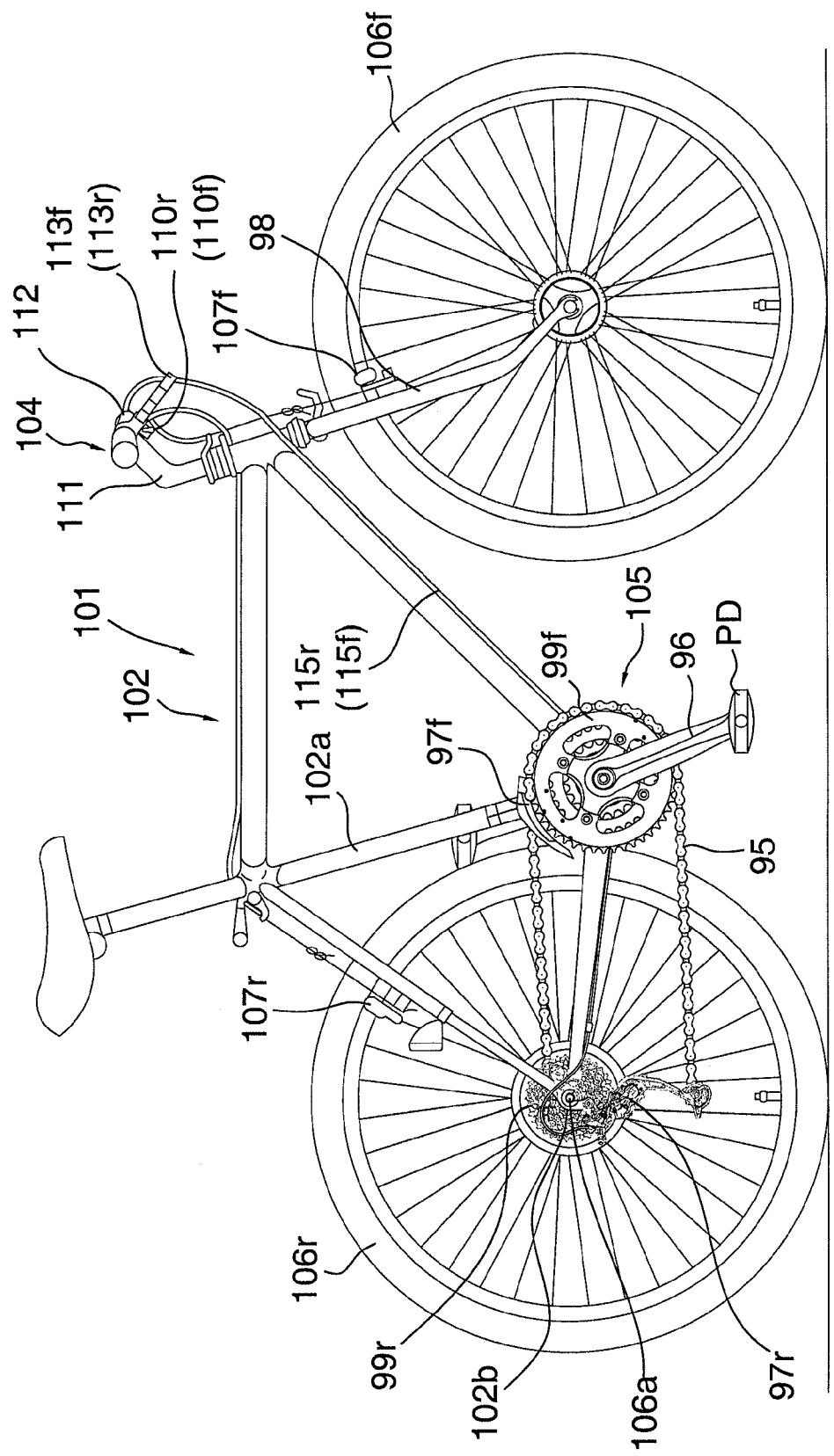
FIG. 1 is a side elevational view of a bicycle with a rear derailleur in accordance with one embodiment.

Referring initially to FIG. 1, a bicycle 101 is illustrated with a rear derailleur 97r in accordance with one embodiment of the present invention. In the illustrated embodiment, the bicycle 101 is a mountain bike for off-road use. The bicycle 101 basically includes a frame 102, a drive train (component) 105, front and rear wheels 106f and 106r, front and rear brake devices 107f and 107r, and a pair of (front and rear) gearshift operating parts 110f and 110r. The frame 102 has diamond shape. A front fork 98 is pivotally coupled to the frame 102 and a handlebar component 104 is fixedly attached to the front fork 98 to steer the bicycle 101. The drive train (component) 105 includes a chain 95, a crank set 96 to which a pair of pedals PD are mounted, front and rear derailleurs 97f and 97r, front and rear sprocket clusters 99f and 99r (i.e. a plurality of front chain rings and a rear sprocket cassette), and a freewheel (not shown) mounted between the rear sprocket cluster 99r and the rear hub of the rear wheel 106r. The front and rear wheels 106f and 106r are mounted to the front fork 98 and the rear part (rear triangle) of the frame 102, respectively. The front and rear brake devices 107f and 107r are provided to selectively apply braking forces to the front and rear wheels 106f and 106r, respectively. The gearshift operating parts 110f and 110r are operated by the rider in order to control movement (e.g., perform gearshift operations) of the front and rear derailleurs 97f and 97r, respectively.

Furthermore, in the following description, forward, rearward, up, and down refer to forward, rearward, up, and down in a state in which the respective parts are mounted on the bicycle.

The handlebar component 104 includes a handlebar stem 111 and a handlebar 112 inserted into and fixedly attached to the top end of the handlebar stem 111. The handlebar stem 111 is inserted into and fixedly attached to the upper part of the front fork 98 to steer the front fork 98, and thus, to steer the front wheel 106f. The handlebar 112 is a flat bar type. The handlebar 112 is provided with a pair of (left and right) brake levers 113f and 113r to control the front and rear brake devices 107f and 107r, respectively. The gearshift operating parts 110f and 110r are disposed in close proximity to these brake levers 113f and 113r. In the illustrated embodiment, the brake levers 113f and 113r are integrated with the gearshift operating parts 110f and 110r. However, brake control devices with the brake levers 113f and 113r can be provided that are separate from the gearshift operating parts 110f and 110r, respectively. The gearshift operating parts 110f and 110r are operatively coupled (linked) to the front and rear derailleurs 97f and 97r via Bowden gearshift cables 115f and 115r, respectively. Each of the shift cables 115f and 115r includes an inner wire and an outer sheath in a conventional manner.

In the drive train 105 the chain 95 is wrapped onto the front and rear sprocket clusters 99f and 99r such that when the rider rotates the crankset 96 via the pedals PD, the bicycle 101 can be propelled in a forward direction in a conventional manner. The front and rear derailleurs 97f and 97r are used to move the chain 95 laterally onto different sprockets of the front and rear sprocket clusters 99f and 99r, respectively, in order to control the gear ratio of the drive train 105.

The front derailleur 97f is mounted on a seat tube 102a of the frame 102 to guide the chain 95 between at least three front shift positions using the shift control device 110f to selectively pull and release the shift cable 115f. Thus, the front derailleur 97f is positioned in one of three gearshift positions by the gearshift operating part 110f, and guides the chain 95 between the front sprocket clusters 99f. The rear derailleur 97r is mounted to a rear hanger part 102b at the rear part (rear triangle) of the frame 102 to guide the chain 95 between a plurality (e.g. nine) of different shift positions using the shift control device 110r to selectively pull and release the shift cable 115r. Thus, the rear derailleur 97r is positioned in one of nine gearshift positions by the gearshift operating part 110r, and guides the chain 95 between the rear sprocket clusters 99f and 99r.

Figure 2:
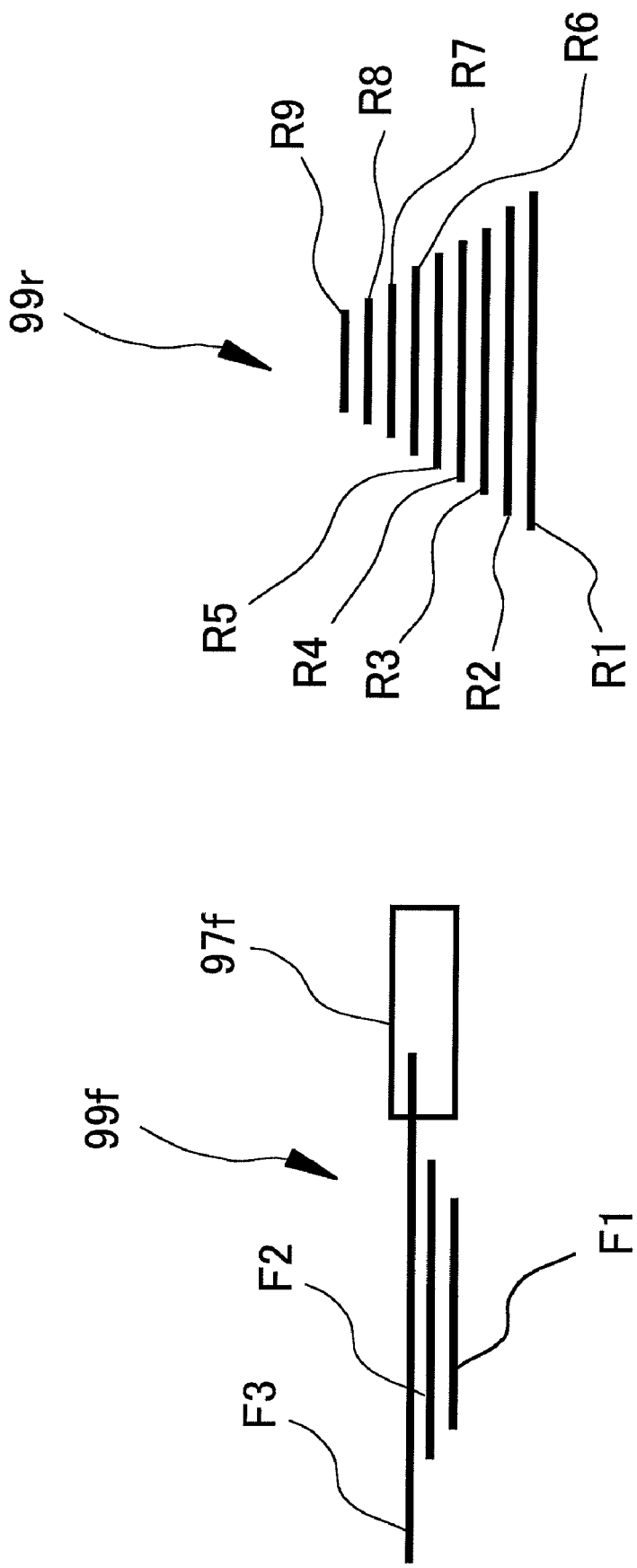
FIG. 2 is a schematic diagram showing one example of an arrangement of front and rear sprockets of the bicycle illustrated in FIG. 1.

As shown in FIG. 2, the front sprocket cluster 99f has three (for example) front sprockets F1, F2, and F3, which have different numbers of teeth and are lined up in the axial direction of the crankshaft. As shown in FIG. 2, the rear sprocket cluster 99r has nine (for example) rear sprockets R1 to R9, which have different numbers of teeth and are lined up in the axial direction along a hub axle 106a of the rear wheel 106r. Here, in the front sprocket cluster 99f, the number of teeth increases in order from the low sprocket F1 located furthest toward the inside, and the top sprocket F3 located furthest toward the outside has the largest number of teeth. On the front sprocket cluster 99f, the number of teeth increases from the low sprocket F1 (the innermost sprocket in the axial direction) such that the number of teeth is largest on the top sprocket F3 (the outermost sprocket in the axial direction). On the rear sprocket cluster 99r, the number of teeth decreases from the low sprocket R1 (the innermost sprocket in the axial direction) such that the number of teeth is smallest on the top sprocket R9 (the outermost sprocket in the axial direction). The front and rear derailleurs 97f and 97r perform gearshift operations by moving the chain 95 to a different one of the plurality of sprockets F1 to F3 and/or to a different one of the plurality of sprockets R1 to R9, respectively. This shifting is initiated by the gearshift operating parts 110f and 110r.

Figure 3:
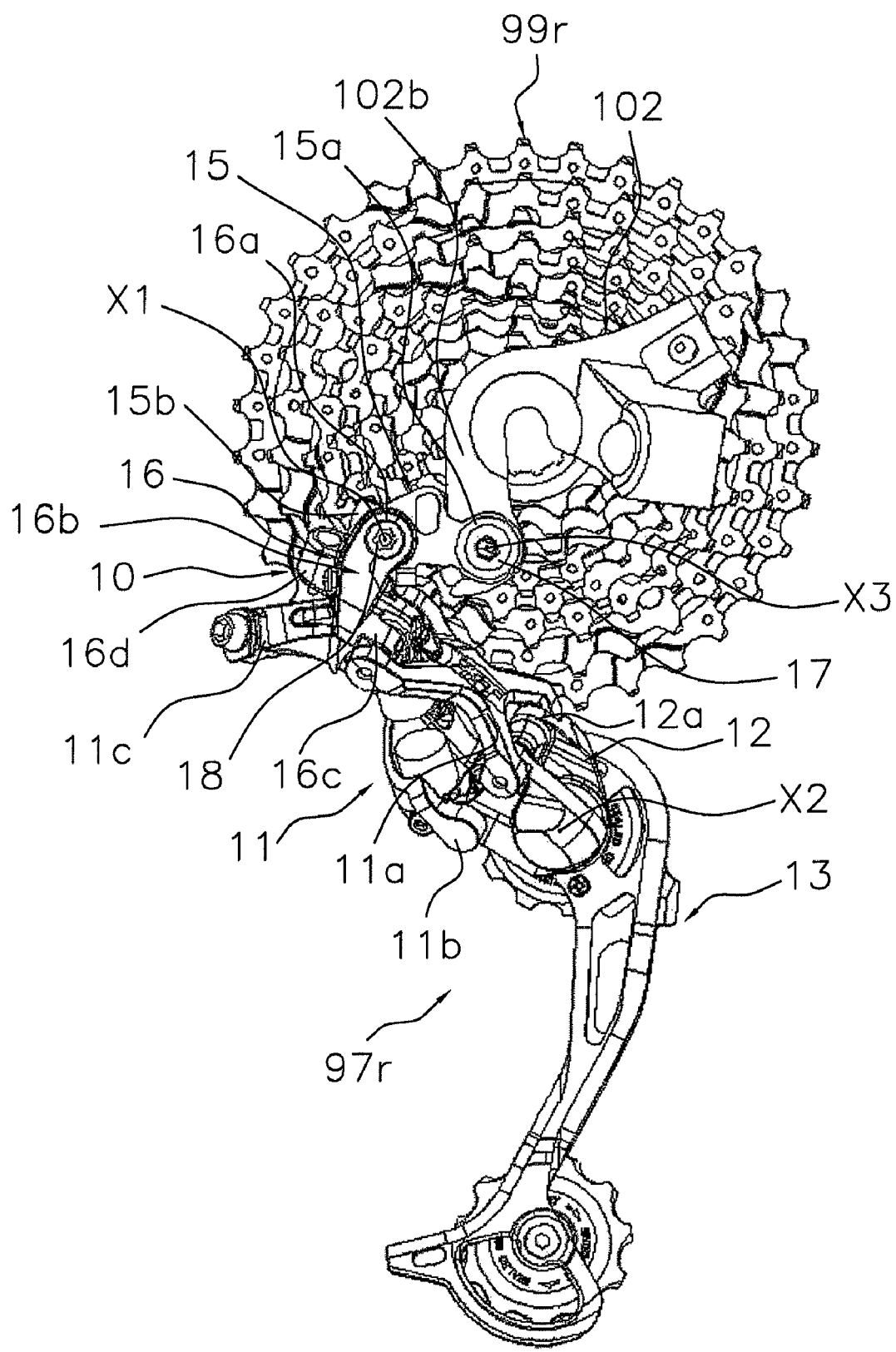
FIG. 3 is an outside elevational view of the rear sprockets and the rear derailleur according to the illustrated embodiment.
Figure 4:
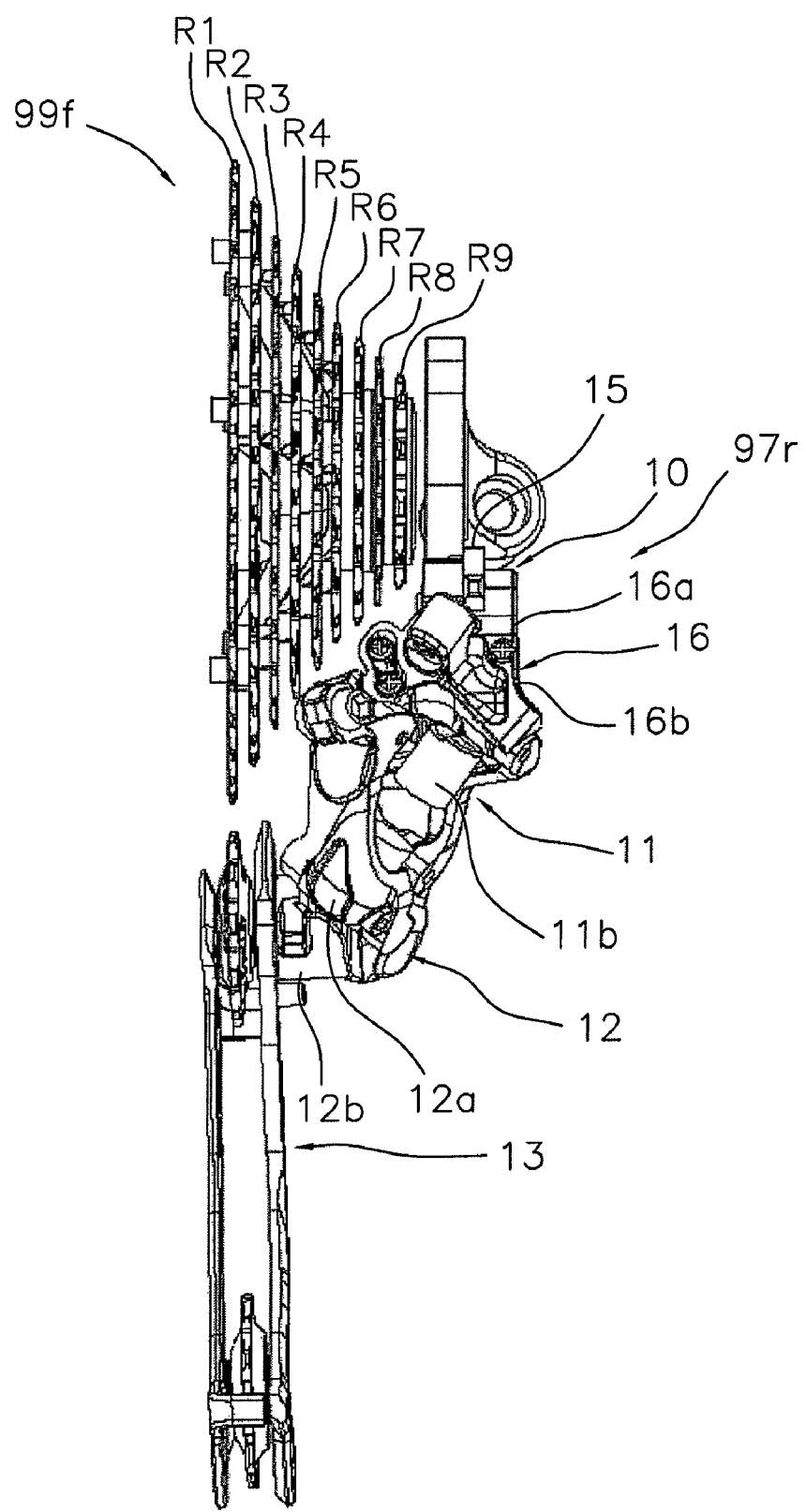
FIG. 4 is a rear end elevational view (left-side of FIG. 3) of the rear sprockets and the rear derailleur according to the illustrated embodiment.

The rear derailleur 97r according to one embodiment of the present invention is mounted on the rear hanger part 102b provided to the rear part of the frame of the bicycle, and selectively transfers the chain 95 to one of the plurality of sprockets R1 through R9 of the rear sprocket cluster 99r. As shown in FIGS. 3 and 4, the rear derailleur 97r comprises a mounting member 10, a link mechanism (one example of a moving mechanism) 11, a movable member 12 and a chain guide 13. The mounting member 10 is fastened to the rear hanger part 102b. The link mechanism 11 has a first end pivotally mounted on the mounting member 10 and can move with respect to the mounting member 10. The movable member 12 is pivotally connected to a second end of the link mechanism 11. The chain guide 13 is pivotally connected to the movable member 12 so that this chain guide is free to swing about a second center pivot axis X2. The chain guide 13 moves the chain 95 in order to transfer the chain 95 to one of the sprockets R1 through R9.

The mounting member 10 includes a bracket 15 and a base member 16. The bracket 15 includes a fastening part 15a and a supporting part 15b. The fastening part 15a can be fastened to the rear hanger part 102b of the frame 102. The supporting part 15b is disposed to the rear of the fastening part 15a in a state in which the fastening part 15a is fastened to the rear hanger part 102b. The base member 16 is mounted on the supporting part 15b so that this base member 16 can rotate about a first center pivot axis X1 that is substantially parallel to the hub axle 106a (FIG. 1) of the rear wheel 106r.

The bracket 15 is a plate-form member made of metal. The fastening part 15a can be fastened to the rear hanger part 102b in a specified phase of rotation in which the supporting part 15b is disposed to the rear. The bracket 15 is screwed into the rear hanger part 102b and is fastened by a first fastening bolt (one example of a shaft member) 17 which has a third center pivot axis X3 that is substantially parallel to the hub axle 106a. A second fastening bolt 18 which has a first center pivot axis X1 is screwed into the supporting part 15b.

As shown in FIGS. 3 and 4, the base member 16 has a cylindrical boss part 16a, an arm part 16b and a link supporting part 16c. The cylindrical boss part 16a is connected to the supporting part 15b by the second fastening bolt 18 so that this boss part 16a can swing about the first center pivot axis X1. The arm part 16b extends in the radial direction from the boss part 16a. The boss part 16a is free to rotate through a specified angular range (e.g., 90 degrees) with respect to the supporting part 15b. The link supporting part 16c is used to mount the link mechanism 11. The link supporting part 16c is formed on the tip end of the arm part 16b. Furthermore, an outer anchoring part 16d for anchoring the outer casing of the gearshift cable 115r is disposed on the rear surface of the arm part 16b.

The link mechanism 11 is a four-point link mechanism for connecting the movable member 12 to the base member 16 so that the movable member 12 can move in relative terms with respect to the base member 16. The link mechanism 11 has an outside link member 11a and an inside link member 11b. One end of each of the outside and inside link members 11a and 11b is mounted at the lower end of the base member 16 via the link supporting part 16c so that this end is free to swing. The other ends of the outside and inside link members 11a and 11b are mounted on the link supporting part 12a of the movable member 12, as described later, so that the outside and inside link members 11a and 11b are free to swing. Both the outside and inside link members 11a and 11b are normally biased toward the sprocket R9 on the small-diameter side by a coil spring (not shown in the figures) which is disposed diagonally. An inner anchoring part 11c is disposed on the outside link member 11a for anchoring the inner cable of the gearshift cable 115r.

The movable member 12 connects the chain guide 13 so that this chain guide is free to swing about the second center pivot axis X2, which is substantially parallel to the hub axle 106a. The movable member 12 has a link supporting part 12a and a guide mounting part 12b. Both link members 11a and 11b of the link mechanism 11 are mounted on the link supporting part 12a so that these link members 11a and 11b are free to swing. Furthermore, the guide mounting part 12b on which the chain guide 13 is mounted so that this chain guide 13 is free to swing. A torsion coil spring (not shown in the figures) is mounted inside the guide mounting part 12b, and the chain guide 13 is biased in the clockwise direction by the torsion coil spring as seen from the outside. As a result, tension acts on the chain 95, and the chain 95 tends not to slip from the sprockets R1 through R9. Furthermore, in the guide mounting part 12b, the mounting shaft 12c protrudes toward the chain guide 13.

Figure 5:
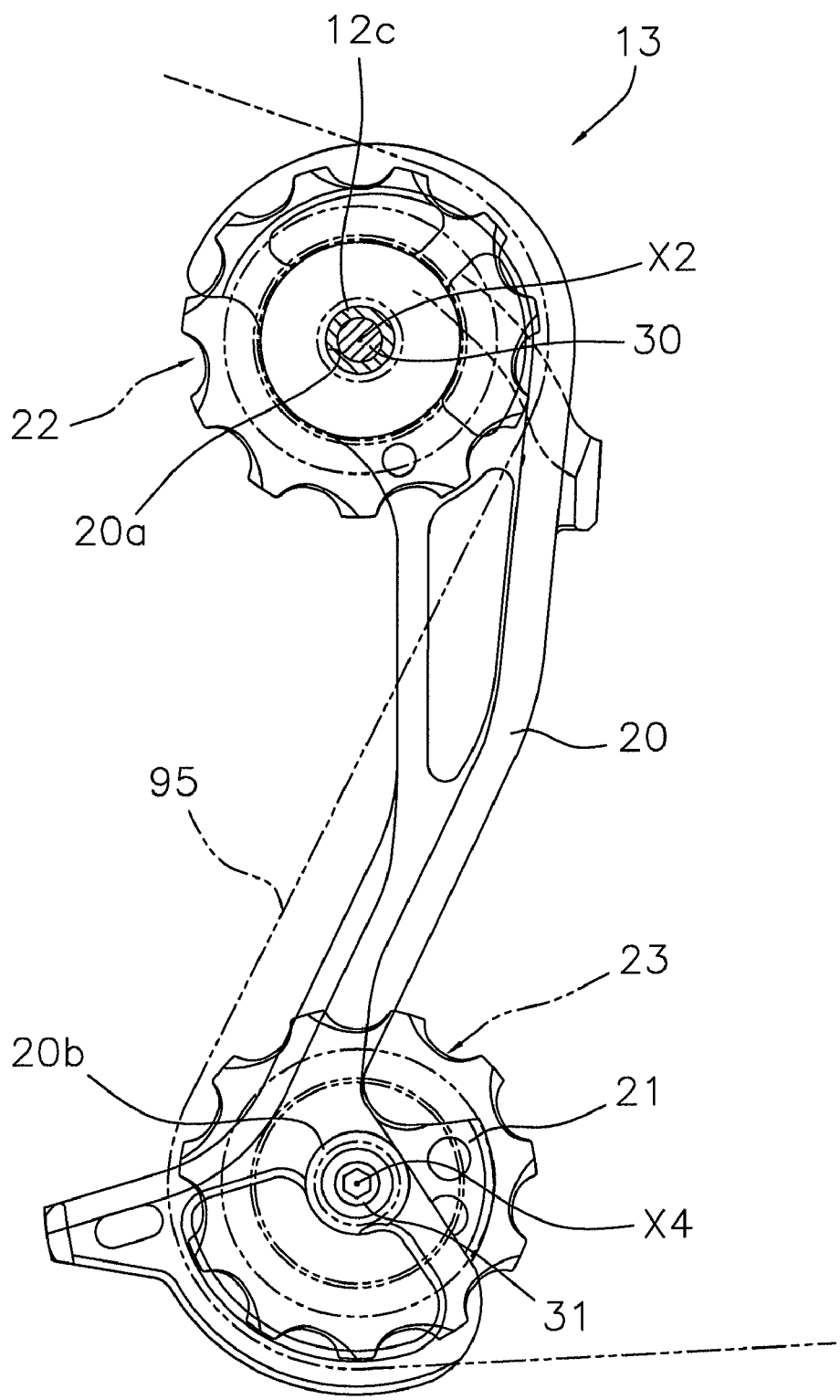
FIG. 5 is an outside elevational view of the chain guide of the rear derailleur according to the illustrated embodiment.
Figure 6:
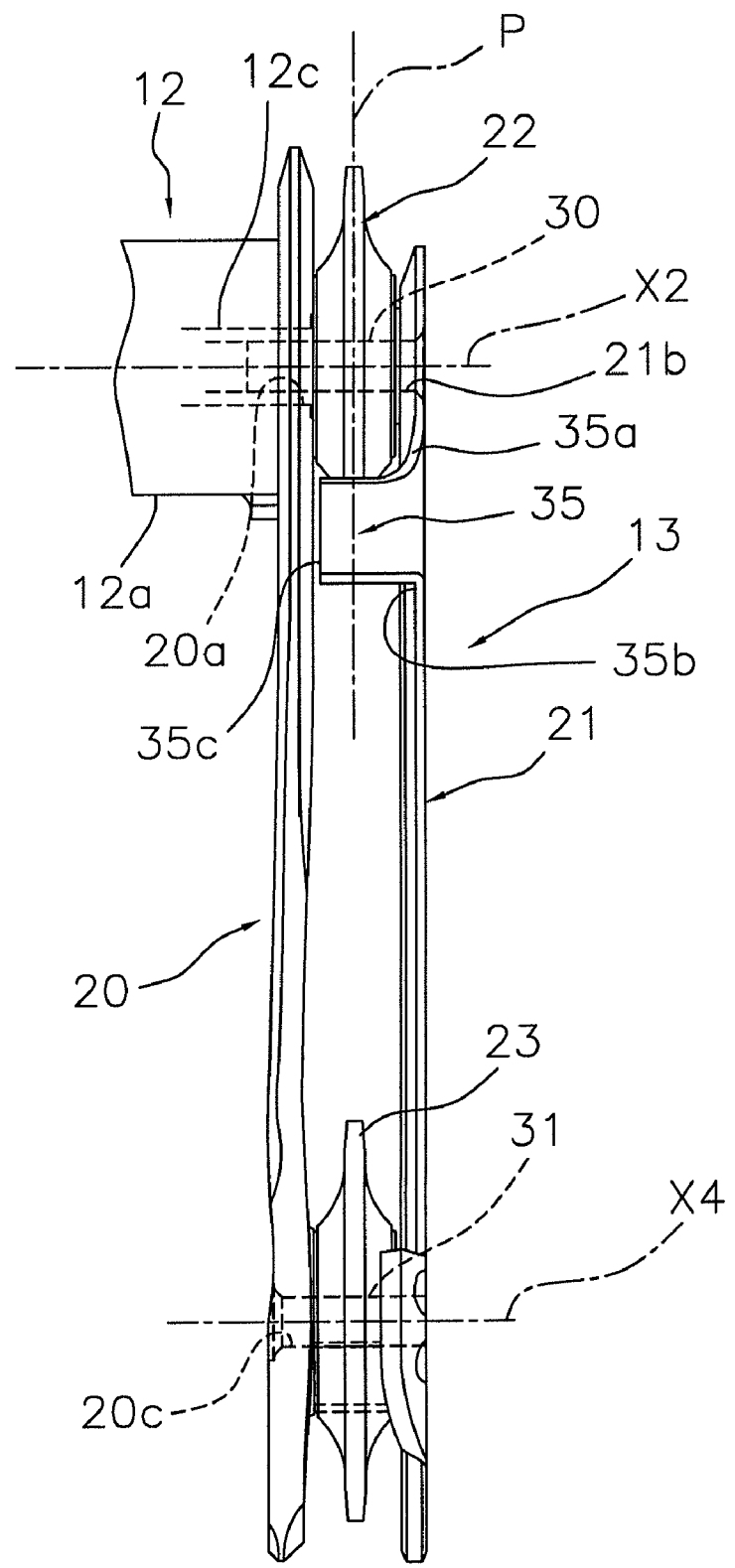
FIG. 6 is a front end elevational view (right-side of FIG. 3) of the chain guide of the rear derailleur according to the illustrated embodiment.
Figure 7:
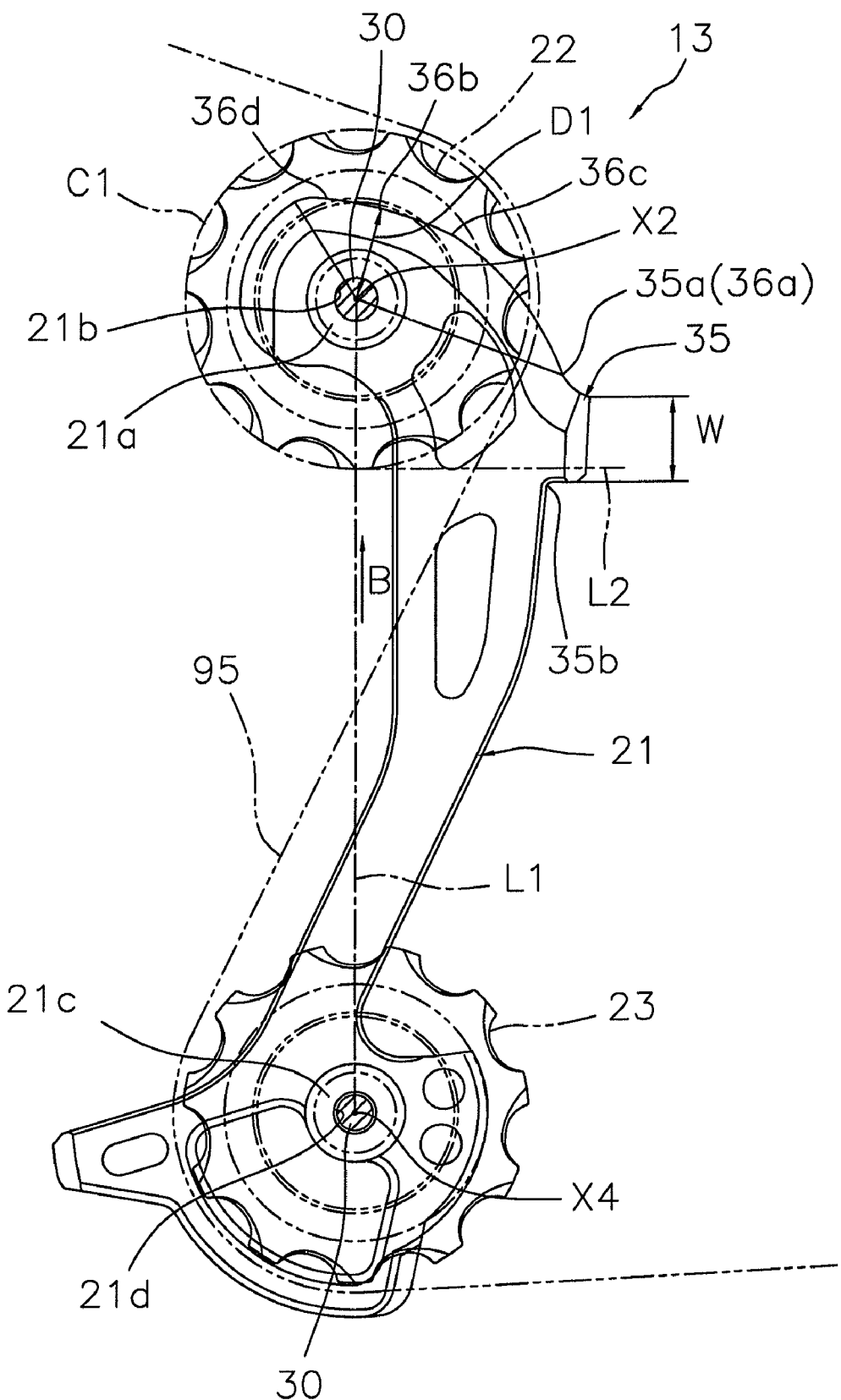
FIG. 7 is an outside elevational view of the inside plate member of the chain guide of the rear derailleur according to the illustrated embodiment.

As shown in FIGS. 5 through 7, the chain guide 13 has an outside plate member 20, an inside plate member 21, a guide pulley 22 and a tension pulley 23. The outside and inside plate members 20 constitute examples of first and second plate members. The outside plate member 20 is mounted on the movable member 12 so that the outside plate member 20 is free to swing. The inside plate member is disposed facing the outside plate member 20. The guide pulley 22 is rotatably supported between the two plate members 20 and 21 at one end of the two plate members 20 and 21. The guide pulley 22 is configured and arranged to engage with the chain 95. The tension pulley 23 is rotatably supported between the two plate members 20 and 21 at the other ends of the two plate members 20 and 21. The tension pulley 23 is configured and arranged to engage with the chain 95.

As shown in FIGS. 5 and 6, the outside plate member 20 is a member formed by press-molding a light metal plate made of an aluminum alloy or the like. Furthermore, in FIG. 5, the outside plate member 20 is seen from the outside. The chain 95 and its engagements with the pulleys 22 and 23 are indicated by imaginary lines in FIG. 6. In FIG. 6, imaginary circles (lines) are also used to indicate the outer periphery of the pulleys 22 and 23. Moreover, in FIG. 6, the chain guide 13 is seen from the front. A swinging supporting part 20a is formed on one end of the outside plate member 20. The swinging supporting part 20a is mounted on the mounting shaft 12c of the movable member 12 so as to be able to swing about the second center pivot axis X2. The tip end of the mounting shaft 12c is fastened by crimping to the inside surface of the outside plate member 20. This mounting shaft 12c is also used in order to rotatably support the guide pulley 22. Accordingly, the rotational center of the guide pulley 22 coincides with the second center pivot axis X2 in this embodiment. However, the swinging center pivot axis X2 and the rotational center of the guide pulley 22 can also be spaced apart.

The outside plate member 20 has a boss part 20b which is used in order to rotatably support the tension pulley 23. The boss part 20b is formed on the other end of the outside plate member 20 with respect to the swinging supporting part 20a. The boss part 20b is provided with a through-hole 20c that accommodates a supporting shaft 31 for rotatably supporting the tension pulley 23. The supporting shaft 31 is a bolt member which has a screw part on the tip end; this member is mounted from the side of the outside plate member 20 and threadedly fastened to the inside plate member 21.

As shown in FIGS. 6 and 7, the inside plate member 21 is a member that is formed by press-molding a light metal plate made of an aluminum alloy or the like. Furthermore, in FIG. 7, the inside plate member 21 is seen from the outside. The chain 95 and its engagements with the pulleys 22 and 23 are indicated by imaginary lines in FIG. 7. In FIG. 7, imaginary circles (lines) are also used to indicate the outer periphery of the pulleys 22 and 23. A first boss part 21a is formed on one end of the inside plate member 21. The first boss part 21a is disposed in a position facing the swinging supporting part 20a of the outside plate member 20. A through-hole 21b is formed in the first boss part 21a. The supporting shaft 30 of the guide pulley 22 passes through this through-hole 21b. The supporting shaft 30 is mounted from the side of the inside plate member 21. The supporting shaft 30 is screwed into a female screw part formed in the mounting shaft 12c of the movable member 12. A second boss part 21c is formed on the other end of the inside plate member 21. The second boss part 21c is used in order to rotatably support the tension pulley 23. The second boss part 21c is provided with a female screw part 21d that accommodates the supporting shaft 31 for supporting the tension pulley 23. The first boss part 21a and second boss part 21c are formed so that these parts are disposed in the same plane.

Furthermore, the chain guide 13 further has a chain slip prevention part 35. The chain slip prevention part 35 is disposed between the outside plate member 20 and inside plate member 21 in the vicinity of the guide pulley 22. In this embodiment, the chain slip prevention part 35 is formed by bending the inside plate member 21 toward the outside plate member 20. It is desirable that the width W of the chain slip prevention part 35 be 10 mm or greater and 50 mm or less. In this embodiment, this width W is approximately 10.5 mm. Furthermore, the width W of the chain slip prevention part 35 is defined as the length measured in the longitudinal direction parallel to a first straight line L2 connecting the rotational centers of the guide pulley 22 and the tension pulley 23 at the position where the chain slip prevention part 35 intersects with the plane P (FIG. 6) passing through the center of a tooth of the guide pulley 22. The chain slip prevention part 35 includes a first end part 35a and a second end part 35b. The first and second end parts 35a and 35b are defined as the points where the chain slip prevention part 35 extends from the inside plate member 21 as best seen in FIG. 6.

Furthermore, in a case in which the direction oriented toward the rotational center X2 of the guide pulley 22 from the rotational center X4 of the tension pulley 23 is taken as the first direction as indicated by the arrow B, the first end part 35a of the chain slip prevention part 35 protruding the furthest in the first direction B is disposed in a position that is closer to the guide pulley 22 than a second straight line L2 which is perpendicular to the first straight line L1 that connects the rotational center X2 of the guide pulley 22 and the rotational center X4 of the tension pulley 23, and which is tangential to an imaginary circle C1 that connects the tips of the teeth of the guide pulley 22. The position of the first end part 35a in the present embodiment is the starting point where the chain slip prevention part 35 begins to bend from the inside plate member 21 toward the outside plate member 20.

Furthermore, the second end part 35b, which protrudes the furthest in the opposite direction from the first direction B, is in a position that is at a greater distance from the guide pulley 22 than the second straight line L2. Moreover, the tip end 35c of the chain slip prevention part 35 is disposed with a slight gap left between this end and the inside surface of the outside plate member 20.

Furthermore, on the outer edge of the inside plate member 21 on the opposite side from the tension pulley 23, a first outer edge part 36c extending from a first outer edge position 36a, which is closest to the first end part 35a, to a second outer edge position 36b, where the distance between the outer peripheral edge and the rotational center X2 of the guide pulley 22 is a minimum distance, has a curvilinear shape which is formed so that the distance from the rotational center decreases in a continuous manner, and the distance D1 at the second outer edge position 36b ranges from 40% of the radius of the imaginary circle C1 to a value obtained by subtracting 4 mm from the radius of the imaginary circle C1. Furthermore, in this embodiment, since the chain slip prevention part 35 is formed by bending the inside plate member 21, the first end part 35a and the first outer edge position 36a substantially coincide.

In the inside plate member 21, the distance from the rotational center X2 in the first outer edge part 36c ranges from 40% to 150% of the radius of the imaginary circle C1, and the second outer edge part 36d, which extends beyond the second outer edge position 36b on the opposite side from the chain slip prevention part 35, has a curvilinear shape which is formed so that the distance from the rotational center X2 increases in a continuous manner, and which is subsequently formed so that the distance from the rotational center X2 remains the same.

In the rear derailleur 97r constructed in this manner, when the inner wire of the gearshift cable 115r is pulled by the operation of the gearshift operating part 110r, the chain guide 13 moves to the inwardly located low side, i.e., the side of the sprocket R1, as a result of the action of the link mechanism 11, and when this pulling is relaxed, the chain guide 13 moves to the outwardly located top side, i.e., the side of the sprocket R9.

Figure 8:
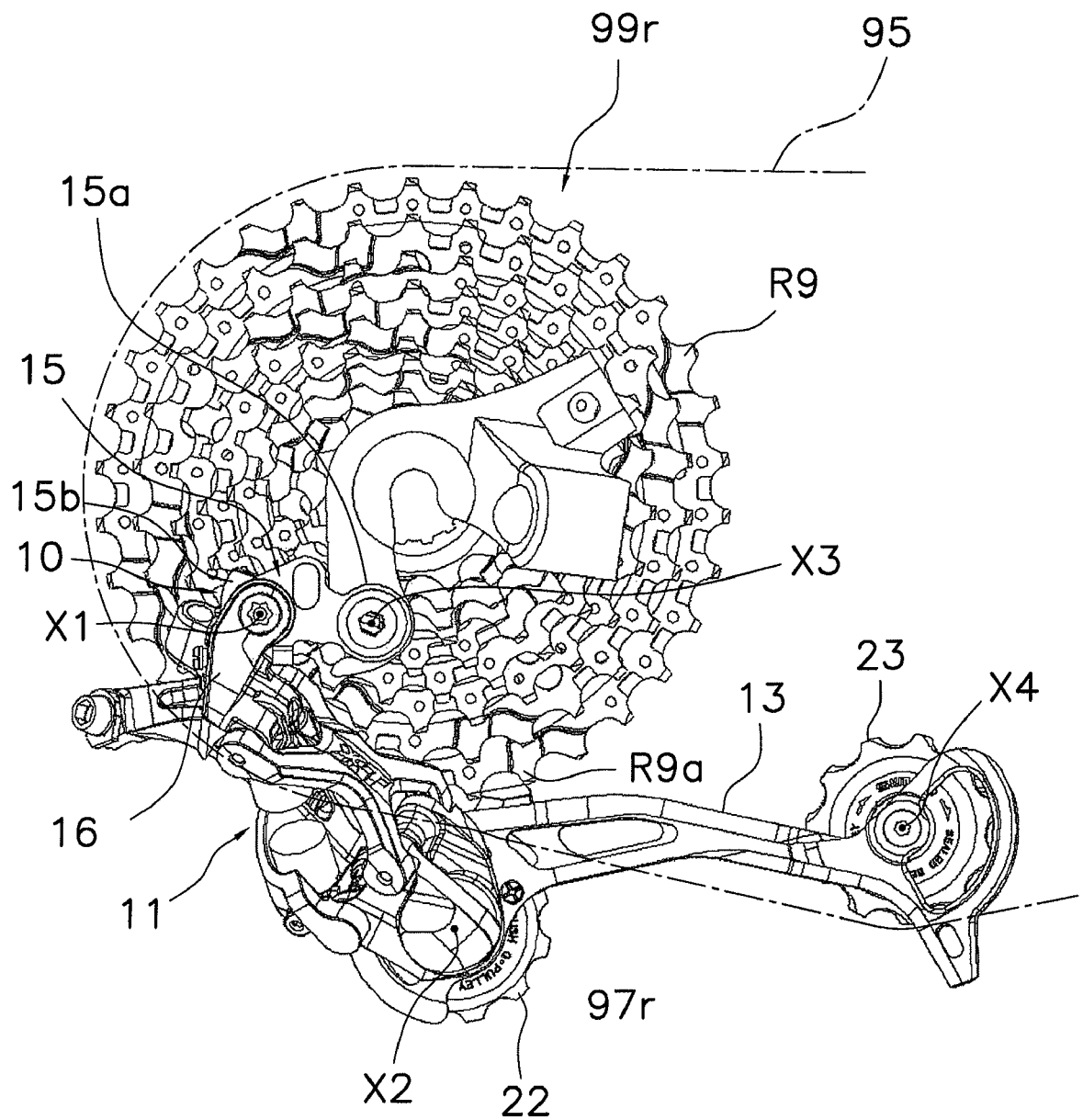
FIG. 8 is an outside elevational view of the rear sprockets and the rear derailleur, showing the operation of the chain guide according to the illustrated embodiment.

The inner wire of the gearshift cable 115r moves as a result of the gearshift operation of the gearshift operating part 110r, and causes the link mechanism 11 to move. As a result of the movement of the link mechanism 11, the chain guide 13 moves into a position facing one of the sprockets R1 through R9 in the rear cassette lined up in the direction of the hub axle, and guides the chain 95 to one of the sprockets. In this case, the chain guide 13 swings about the second center pivot axis X2. The chain guide 13 swings furthest forward when the chain 95 is mounted on the maximum-diameter front and rear sprockets F3 and R9, as shown in FIG. 8. As a result, for example, during off-road operation with violent irregularities in the surface, the chain slip prevention part 35 disposed in close proximity to the guide pulley 22 may come into contact with the teeth R9a of the maximum-diameter sprocket R9.

Figure 9:
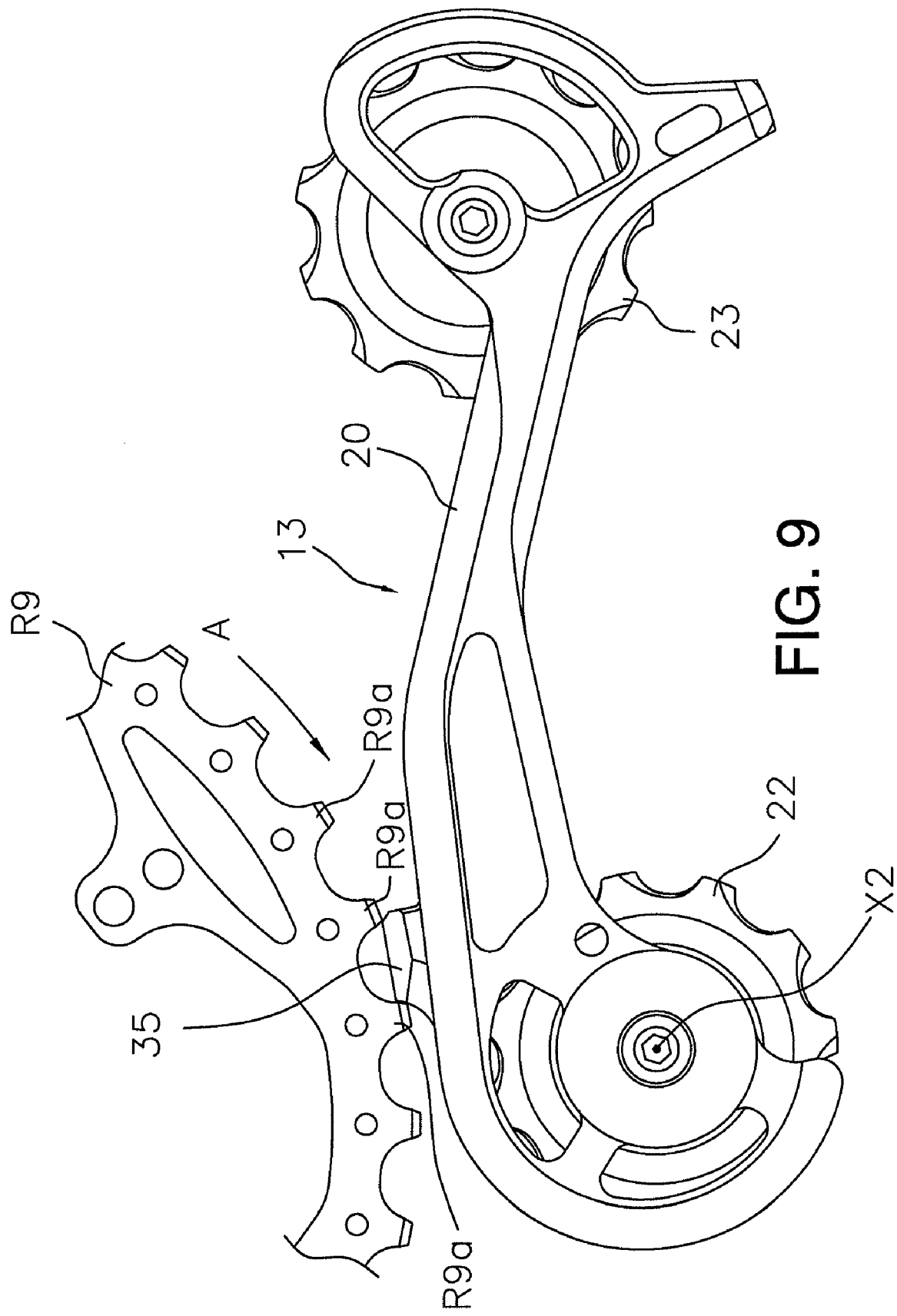
FIG. 9 is an enlarge partial view of the chain guide of the rear derailleur illustrated in FIG. 8, showing the operation of the chain guide according to the illustrated embodiment.

The gap between two teeth in commonly used sprockets is approximately 10 mm. Here, the width of the chain slip prevention part 35 is 10 mm or greater and 50 mm or less. Therefore, even if one end of the chain slip prevention part 35 should contact the gap between the teeth of a rear sprocket, the other end tends not to enter the gap between the teeth. The first center pivot axis X1, which is the swinging center of the base member 16, is positioned to the rear of the fastening part 15a when the bracket 15 is fastened to the frame 102 of the bicycle. Since the first center pivot axis X1 is disposed to the rear of the fastening part 15a and is at a considerable distance from the rotational center of the sprocket R9, the rotational direction of the sprocket R9 and the swinging direction of the chain guide 13 caused by the swinging of the base member 16 about the first center pivot axis X1 are greatly shifted in position. As a result, as shown in FIG. 9, even if one end of the chain slip prevention part 35 should contact the space between teeth R9a of the sprocket R9, the chain slip prevention part 35 can easily slip out from the space between the teeth R9a when the sprocket R9 is caused to rotate in the forward direction indicated by the arrow A by pushing the pedals in the forward direction. Here, since the width of the chain slip prevention part 35 disposed on the chain guide 13 is set at a considerable width of 10 mm or greater and 50 mm or less, the ends of the chain slip prevention part 35 do not enter the gaps between teeth R9a of the sprocket. Furthermore, since the supporting part 15b for supporting the swinging base member 16 is disposed to the rear of the fastening part 15a, the first center pivot axis X1, which is the swinging center of the base member 16, is greatly shifted in position toward the rear from the fastening part of the frame 102 (the third center pivot axis X3, which is the fixed part of the fastening part 15a). Accordingly, even if one end of the chain slip prevention part 35 comes into contact with the space between the teeth R9a, the swinging direction of the chain guide 13 caused by the swinging of the base member 16 about the first center pivot axis X1 is greatly shifted in position toward the outside in the radial direction of the sprocket R9 with respect to the rotational direction of the sprocket R9 when the sprocket R9 is caused to rotate in the forward direction. As a result, even if one end of the chain slip prevention part 35 should contact the gap between the teeth R9a, the chain slip prevention part 35 can easily slip out from the gap between the teeth. Accordingly, the chain slip prevention part 35 tends not to engage with the sprocket R9.

Figure 10:
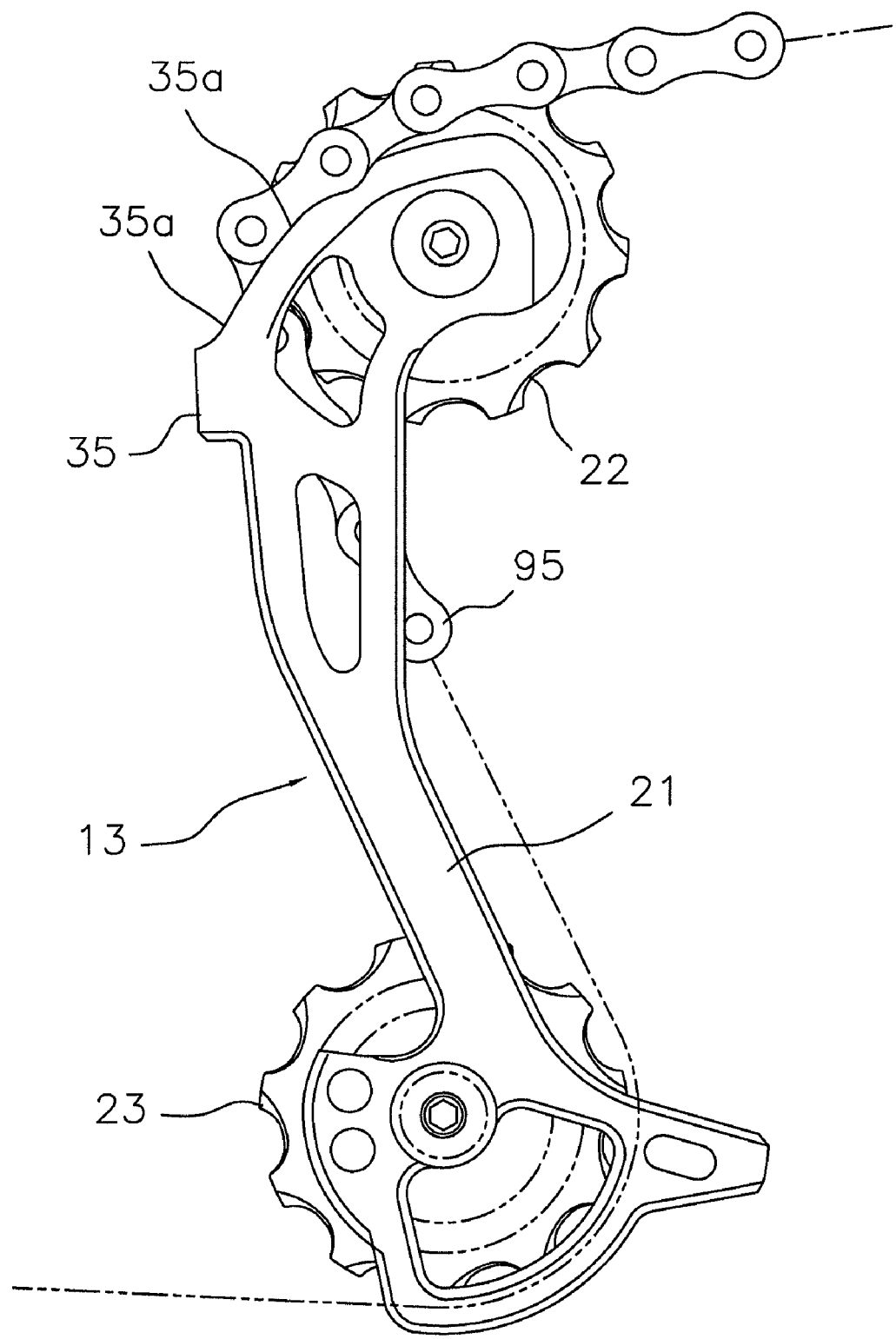
FIG. 10 is an inside elevational view of the chain guide of the rear derailleur illustrated in FIG. 9, showing a state in which the chain has slipped off.
Figure 11:
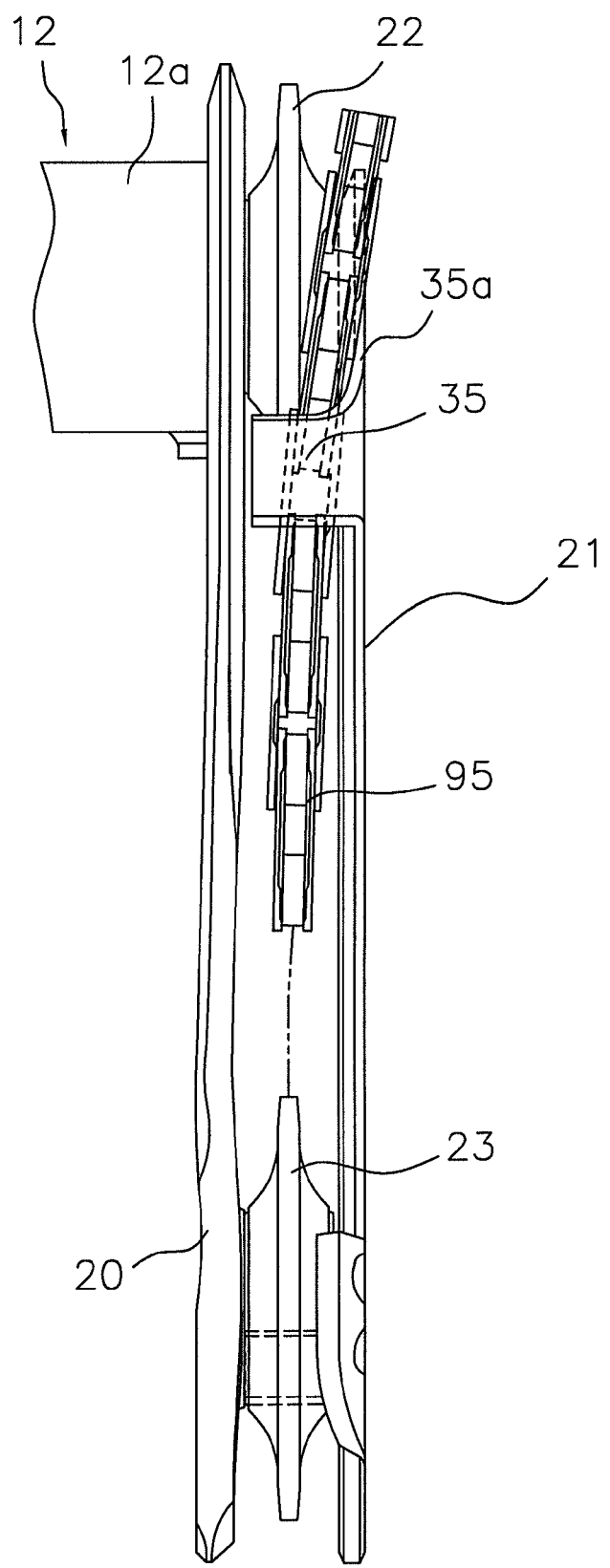
FIG. 11 is a rear end elevational view (left-side of FIG. 10) of the chain guide of the rear derailleur showing a state in which the chain has slipped off.

On the other hand, in the rear derailleur 97r, the chain 95 may slip off from the guide pulley 22 toward the outside (right side in FIG. 11) of the inside plate member 21, as shown in FIGS. 10 and 11, when the crank set 96 is rotated in the reverse direction (rotated in the counterclockwise direction in FIG. 1) in a case in which an upshifting operation has been performed by the gearshift operating part 110r without the rotation of the crank set 96, and the chain guide 13 has moved to a sprocket on the small-diameter side. In this state, the chain 95 that has slipped off returns to the space between the outside and inside plate members 20 and 21 in the vicinity of the first end part 35a of the chain slip prevention part 35. Here, as shown in FIG. 7, the first end part 35a of the chain slip prevention part 35 is disposed in a position that is closer to the guide pulley 22 than a second straight line L2, which is perpendicular to a first straight line L1 that connects the rotational center X2 of the guide pulley 22 and the rotational center X4 of the tension pulley 23, and which is tangential to an imaginary circle C1 that connects the tips of the teeth of the guide pulley 22. Accordingly, the chain 95 returns to the space between the two plate members 20 and 21 in the vicinity of the guide pulley 22, and although the chain 95 may slip from the guide pulley 22, the extent of this slipping is slight. In other words, the part of the chain 95 that has slipped off is not at a considerable distance from the tooth parts of the guide pulley 22.

Furthermore, on the outer edge of the inside plate member 21 on the opposite side from the tension pulley 23, the first outer edge part 36c extending from the first outer edge position 36a that is closest to the first end part 35a to the second outer edge position 36b, where the distance between the outer edge and the rotational center X2 of the guide pulley 22 is a minimum distance, has a curvilinear shape that is formed so that the distance from the rotational center X2 decreases in a continuous manner from the first outer edge position 36a to the second outer edge position 36b. Furthermore, the distance at the second outer edge position 36b ranges from 40% of the radius of the imaginary circle C1 to the a value obtained by subtracting 4 mm from the radius of the imaginary circle C1. Accordingly, in the first outer edge part 36c contacted by the chain 95 that has slipped off, the distance to the rotational center X2 of the guide pulley 22 decreases in a continuous manner from the first outer edge position 36a toward the second outer edge position 36b, and the distance at the second outer edge position 36b is relatively large. As a result, when the crank set 96 is turned in the forward direction, and the chain 95 is moved in the forward direction, the chain 95 that has slipped off in a position near the guide pulley 22 is pulled by one of the sprockets R1 through R9 and is caused to ride over the first outer edge part 36c from the vicinity of the first outer edge position 36a. The chain 95 is guided by this operation and is caused to reengage with the guide pulley 22. As a result, the chain 95 that has slipped off from the guide pulley 22 can return to the guide pulley 22.

Here, the first end part 35a of the chain slip prevention part 35 is disposed in a position near the guide pulley 22 that protrudes furthest in the first direction B, and the first outer edge part 36c that comes into contact with the chain 95 when the chain 95 slips off is constructed so that the distance from the rotational center X2 in the area extending from the first outer edge position 36a to the second outer edge position 36b decreases in a continuous manner. Moreover, even at the second outer edge position 36b, the distance from the rotational center of the guide pulley 22 is large, i.e., is a distance ranging from 40% of the radius of the imaginary circle C1 to a value obtained by subtracting 4 mm from the radius of the imaginary circle C1. Accordingly, even if the chain 95 should slip from the guide pulley 22, the chain 95 is pulled so that the chain 95 rides over the first outer edge part 36c and can be returned to the guide pulley 22 when the chain 95 is moved in the forward direction.

Furthermore, since the distance from the rotational center of the guide pulley 22 does not exceed a value obtained by subtracting 4 mm from the radius of the imaginary circle C1 at the second outer edge position 36b, this part does not interfere with the movement of the chain in the direction of the hub axle during ordinary gearshift operations.

In the abovementioned embodiment, the manual rear derailleur of a mountain bike was described. However, the present invention is not limited to this. The present invention may be applied to any rear derailleur having a guide pulley and a tension pulley, and this derailleur can be driven by an electrical actuator or the like.

In the abovementioned embodiment, the chain slip prevention part was formed by bending the inside plate member. However, it would also be possible to bend the outside plate member. It is further possible, for example, to use a cylindrical member that is disposed in an upright position on either of the plate members. The member can be installed so as to connect both plate members. In cases in which the chain slip prevention part is formed by a cylindrical member, the first end part refers to the part in a position that protrudes farthest in the first direction among the members. The first outer edge position in this case is the outer edge having the shortest distance from the first end part, and can easily be defined by measurement. In such a case, the first end part and the first outer edge position do not always coincide. Furthermore, the width of the chain slip prevention part in this case is the diameter of a cross-sectional circle obtained by cutting the cylindrical part along the plane P.

In the abovementioned embodiment, the center pivot axis X2 used for the swinging of the outside plate member and the rotational center of the guide pulley 22 were caused to coincide. However, the center pivot axis X2 and the rotational center can also be disposed separately without being caused to coincide.

In the abovementioned embodiment, a link mechanism was shown as an example of a moving mechanism. However, the moving mechanism is not limited to a link mechanism, and any configuration, such as a screw mechanism, lever mechanism or the like may be used as long as this mechanism allows movement of the movable member with respect to the base member.

General Interpretation of Terms

In understanding the scope of the present invention, the term "configured" as used herein to describe a component, section or part of a device includes hardware and/or software that is constructed and/or programmed to carry out the desired function. In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A bicycle rear derailleur comprising:
a mounting member including a bracket having a fastening part that is configured to be fastened to a bicycle frame and a supporting part disposed rearward of the fastening part when the fastening part is fastened to the bicycle frame;
a base member rotatably mounted on the supporting part to rotating about a first center pivot axis;
a moving mechanism movably connected at a first end to the base member to move with respect to the base member;
a movable member connected to a second end of the moving mechanism; and
a chain guide including
a first plate member pivotally connected to the movable member to swing about a second center pivot axis,
a second plate member connected to the first plate member to define a chain receiving gap between the first and second plate members,
a guide pulley rotatably supported between the first and second plate members at first ends of the first and second plate members,
a tension pulley rotatably supported between the first and second plate members at second ends of the first and second plate members, and
a chain slip prevention part disposed between the first and second plate members in a vicinity of the guide pulley with the chain slip prevention part having a width of 10 mm or greater and 50 mm or less,
the chain slip prevention part including a first end part and a second end part, the first end part being a farthest point of the chain slip prevention part from the tension pulley as measured in a first direction that is parallel to a first straight line running between rotational centers of the guide pulley and the tension pulley with the first end point being located at one circumferential end point of the chain slip prevention part along a circumferential direction about the rotational center of the guide pulley, the second end part being a closest point of the chain slip prevention part to the tension pulley as measured in the first direction that is parallel to the first straight line running between the rotational centers of the guide pulley and the tension pulley with the second end part being located at the other circumferential end point of the chain slip prevention part along the circumferential direction about the rotational center of the guide pulley, the first end part being disposed closer to the rotational center of the guide pulley than the second end part, and
the fastening part including a shaft member that has a third center pivot axis, with a minimum distance from the first center pivot axis to the chain slip prevention part being greater than a minimum distance from the third center pivot axis to the chain slip prevention part when the bracket is fastened to the bicycle frame.

2. The bicycle rear derailleur according to claim 1, wherein the rotational center of the guide pulley coincides with the second center pivot axis.

3. The bicycle rear derailleur according to claim 1, wherein the chain slip prevention part is an integral, one-piece unitary part of one of the first and second plate members with the chain slip prevention part being bent from the one of the first and second plate members toward the other of the first and second plate members.

4. The bicycle rear derailleur according to claim 2, wherein the chain slip prevention part is located on a second straight line extending perpendicularly to the first straight line and extending tangentially to an imaginary circle connecting outer tips of teeth of the guide pulley.

5. A bicycle rear derailleur comprising:
a mounting member configured to be fastened to a bicycle frame;
a moving mechanism movably connected at a first end to the mounting member to move with respect to the mounting member;
a movable member connected to a second end of the moving mechanism; and
a chain guide including
a first plate member pivotally connected to the movable member to swing,
a second plate member connected to the first plate member to define a chain receiving gap between the first and second plate members,
a guide pulley rotatably supported between the first and second plate members at first ends of the first and second plate members,
a tension pulley rotatably supported between the first and second plate members at second ends of the first and second plate members, and
a chain slip prevention part disposed between the first and second plate members,
the chain slip prevention part including a first end part and a second end part with an inner surface of the chain slip prevention part extending between the first and second end parts, the first end part being a farthest point of the chain slip prevention part from the tension pulley as measured in a first direction that is parallel to a first straight line running between rotational centers of the guide pulley and the tension pulley with the first end point being located at one circumferential end point of the chain slip prevention part along a circumferential direction about the rotational center of the guide pulley, the second end part being a closest point of the chain slip prevention part to the tension pulley as measured in the first direction that is parallel to the first straight line running between the rotational centers of the guide pulley and the tension pulley with the second end part being located at the other circumferential end point of the chain slip prevention part along the circumferential direction about the rotational center of the guide pulley, with the first end part being disposed at a position that is closer to the guide pulley than a point on the inner surface of the chain slip prevention part that is disposed on a second straight line extending perpendicularly to the first straight line and extending tangentially to an imaginary circle connecting outer tips of teeth of the guide pulley, the inner surface of the chain slip prevention part being convexly shaped with respect to the guide pulley with the first end part being disposed closer to the rotational center of the guide pulley than the second end part, and
the second plate member including an outer peripheral edge having a first outer edge part with a curvilinear shape extending from a first outer edge position, which is closest to the first end part, to a second outer edge position, which is where the outer peripheral edge is at a minimum distance from the rotational center of the guide pulley, the curvilinear shape of the outer edge part is configured so that a distance measured from the rotational center of the guide pulley to the outer edge part decreases in a continuous manner from the first outer edge position to the second outer edge position, and the minimum distance at the second outer edge position is in a range extending from 40% of a radius of the imaginary circle to a value obtained by subtracting 4 mm from the radius of the imaginary circle.

6. The bicycle rear derailleur according to claim 5, wherein the first outer edge part of the second plate member is spaced from the rotational center of the guide pulley by a distance that is in a range extending from 40% to 150% of the radius of the imaginary circle.

7. The bicycle rear derailleur according to claim 5, wherein the chain slip prevention part is an integral, one-piece unitary part of the second plate member with the chain slip prevention part being bent from the second plate member toward the first plate member so that the first end part and the first outer edge position substantially coincide.

8. The bicycle rear derailleur according to claim 5, wherein the mounting member includes
a bracket having a fastening part that is configured to be fastened to a bicycle frame and a supporting part disposed rearward of the fastening part when the fastening part is fastened to the bicycle frame, and
a base member rotatably mounted on the supporting part.

9. The bicycle rear derailleur according to claim 5, wherein the rotational center of the guide pulley coincides with a center pivot axis about which the first plate member swings relative to the movable member.

10. The bicycle rear derailleur according to claim 9, wherein
the chain slip prevention part is located on the second straight line extending perpendicularly to the first straight line and extending tangentially to the imaginary circle connecting the outer tips of the teeth of the guide pulley.

11. A bicycle rear derailleur comprising:
a mounting member configured to be fastened to a bicycle frame;
a moving mechanism movably connected at a first end to the mounting member to move with respect to the mounting member;
a movable member connected to a second end of the moving mechanism; and
a chain guide including
a first plate member pivotally connected to the movable member to swing,
a second plate member connected to the first plate member to define a chain receiving gap between the first and second plate members,
a guide pulley rotatably supported between the first and second plate members at first ends of the first and second plate members,
a tension pulley rotatably supported between the first and second plate members at second ends of the first and second plate members, and
a chain slip prevention part disposed between the first and second plate members,
the chain slip prevention part including a first end part and a second end part, the first end part being a farthest point of the chain slip prevention part from the tension pulley as measured in a first direction that is parallel to a first straight line running between rotational centers of the guide pulley and the tension pulley with the first end point being located at one circumferential end point of the chain slip prevention part along a circumferential direction about the rotational center of the guide pulley, the second end part being a closest point of the chain slip prevention part to the tension pulley as measured in the first direction that is parallel to the first straight line running between the rotational centers of the guide pulley and the tension pulley with the second end part being located at the other circumferential end point of the chain slip prevention part along the circumferential direction about the rotational center of the guide pulley, with the first end part being disposed at a position that is closer to the guide pulley than a second straight line extending perpendicularly to the first straight line and extending tangentially to an imaginary circle connecting outer tips of teeth of the guide pulley, the first end part being disposed closer to the rotational center of the guide pulley than the second end part, and the second plate member including an outer peripheral edge having a first outer edge part with a curvilinear shape extending from a first outer edge position, which is closest to the first end part, to a second outer edge position, which is where the outer peripheral edge is at a minimum distance from the rotational center of the guide pulley, the curvilinear shape of the outer edge part is configured so that a distance measured from the rotational center of the guide pulley to the outer edge part decreases in a continuous manner from the first outer edge position to the second outer edge position, and the minimum distance at the second outer edge position is in a range extending from 40% of a radius of the imaginary circle to a value obtained by subtracting 4 mm from the radius of the imaginary circle, the first outer edge part of the second plate member being spaced from the rotational center of the guide pulley by a distance that is in a range extending from 40% to 150% of the radius of the imaginary circle, the outer peripheral edge of the second plate member including a second outer edge part with a curvilinear shape extending beyond the second outer edge position on an opposite side from the chain slip prevention part, the curvilinear shape of the second outer edge part being formed so that a distance from the rotational center increases in a continuous manner as the second outer edge part extends away from the second outer edge position.

12. The bicycle rear derailleur according to claim 11, wherein the rotational center of the guide pulley coincides with a center pivot axis about which the first plate member swings relative to the movable member.

13. The bicycle rear derailleur according to claim 12, wherein the chain slip prevention part is located on the second straight line extending perpendicularly to the first straight line and extending tangentially to the imaginary circle connecting the outer tips of the teeth of the guide pulley.

* * * * *